J. B. MURRAY AND T. E. MURRAY, Jr.
APPARATUS FOR ELECTRICALLY WELDING THE SECTIONS OF A HOLLOW OBJECT.
APPLICATION FILED SEPT. 18, 1919.
1,333,274. Patented Mar. 9, 1920.
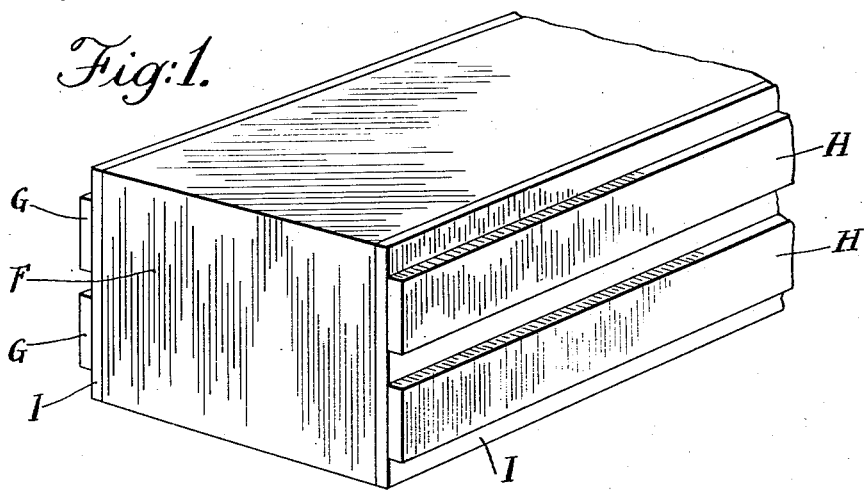
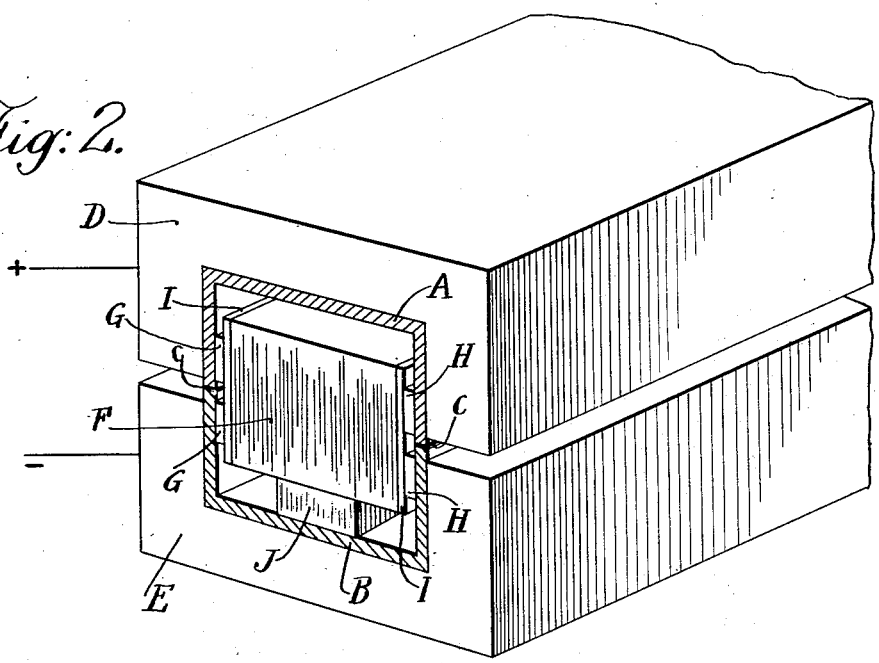
Inventors
Thomas E. Murray Jr.
Joseph B. Murray
By their Attorney

UNITED STATES PATENT OFFICE.

JOSEPH B. MURRAY AND THOMAS E. MURRAY, JR., OF BROOKLYN, NEW YORK.

APPARATUS FOR ELECTRICALLY WELDING THE SECTIONS OF A HOLLOW OBJECT.

1,333,274.      Specification of Letters Patent.      Patented Mar. 9, 1920.

Application filed September 18, 1919. Serial No. 324,556.

*To all whom it may concern:*

Be it known that we, JOSEPH B. MURRAY and THOMAS E. MURRAY, Jr., citizens of the United States, residing at Brooklyn, in the county of Kings and State of New York, have invented a certain new and useful Improvement in Apparatus for Electrically Welding the Sections of a Hollow Object, of which the following is a specification.

Hollow objects of thin metal, such as tubes, are now made by electrically welding together longitudinal sections of said objects. We have found that during the welding operation—especially when heavy currents are used—there is a tendency of the thin walls of the sections to collapse, throwing the edges at the weld out of registry and preventing perfect union, besides burning the metal at the irregular and limited points of contact.

Our present apparatus obviates this difficulty, and consists in the construction whereby we support the thin metal from within the sections and on opposite sides of and adjacent to the welding joint.

In the accompanying drawing—

Figure 1 is a perspective view of the core. Fig. 2 is a similar view, showing the core in place within the sections to be welded together to form the hollow object, said sections being seated in the welding electrodes.

Similar letters of reference indicate like parts.

A and B are two elongated sections of thin metal, here channel-shaped, which are to be welded at the joints C, formed at their registering edges in order to produce the desired hollow—here tubular—object. Each section is seated in a correspondingly formed recess in the electrodes D and E. The edges of said sections protrude into the space between the electrodes to form "take-ups."

Within the sections and of the same length is a core F, having on each of its vertical opposite faces a pair of elongated metal plates G G and H H. The core body may be of hard wood or metal. In the latter case in order to avoid short-circuiting between the members of said pairs of plates, layers of insulation I should be interposed between said plates and the core body.

The core is supported within the seated sections in any suitable way—as by an elongated block J of cement resting on the lower section. The plates G G and H H are to be equal in length to the joint and to be disposed in contact with the inner faces of the sections A, B with the members of each pair respectively on opposite sides of the joint.

In this way the thin vertical walls of the sections are supported and held between said plates and the electrodes, and are thus prevented from collapsing during the welding operation. The extruded metal or bur formed at the joint enters the space between the members of each pair of plates G G and H H, and so serves to protect the core body from the high heat developed at the joint.

We claim:

1. An apparatus for electrically welding the sections of a stationary hollow object, comprising supporting means in contact with opposite faces of the walls of said sections and located on opposite sides of the welding joint.

2. An apparatus for electrically welding a stationary hollow object, comprising a stationary core within said object and in contact with the same at both sides of the welding joint, and means for closing together the edges at said joint.

3. An apparatus for electrically welding a stationary hollow object, comprising a stationary core within said object and in contact with the same at both sides of the welding joint, and means for closing together the edges at said joint and for leading the welding current to said joint.

4. An apparatus for electrically welding together the longitudinal half sections of a stationary tube, comprising a stationary core fitting within said tube, removable therefrom and bearing against the tube on opposite sides of the joint, and means for connecting said tube sections in series circuit.

5. An apparatus for electrically welding together the longitudinal half sections of a stationary tube, comprising a stationary core fitting within said tube, removable therefrom and bearing against the tube on opposite sides of the joint, and means for connecting said tube sections in series circuit and for moving said sections into contact at the welding joint.

6. An apparatus for electrically welding the sections of a hollow object, comprising electrodes having recesses wherein said sections are seated, and removable means disposed within said sections and in contact with the walls thereof on each side of the welding joint.

7. An apparatus for electrically welding the sections of a hollow object, comprising electrodes having recesses wherein said sections are seated and a core disposed between said sections and having on its opposite sides pairs of metal plates, the members of each of said pairs being respectively located on opposite sides of the welding joint and in contact with the inner surfaces of said sections.

In testimony whereof we have affixed our signatures in presence of two witnesses.

JOSEPH B. MURRAY.
THOMAS E. MURRAY, Jr.

Witnesses:
GERTRUDE T. PORTER,
MAY T. McGARRY.